June 22, 1948.    I. B. PENNIMAN    2,443,991
RELAY

Filed Jan. 20, 1947    2 Sheets-Sheet 1

TO CONTROLLED CIRUIT

INVENTOR
IRA B. PENNIMAN

BY Oldham & Oldham
ATTORNEYS

June 22, 1948.    I. B. PENNIMAN    2,443,991
RELAY
Filed Jan. 20, 1947    2 Sheets-Sheet 2
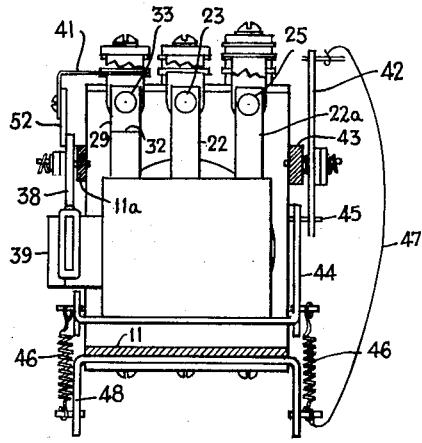
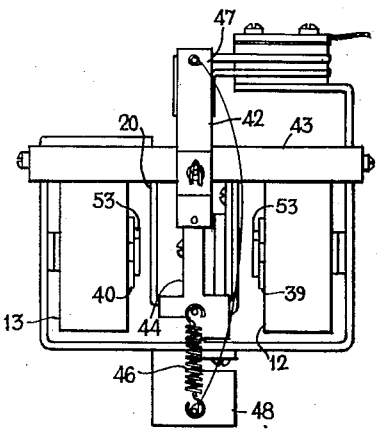
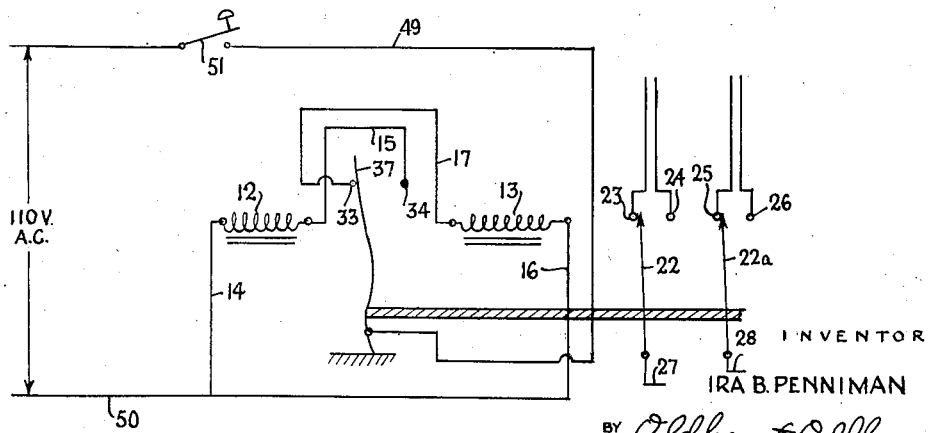
INVENTOR
IRA B. PENNIMAN
BY Oldham & Oldham
ATTORNEYS Patented June 22, 1948

2,443,991

UNITED STATES PATENT OFFICE 2,443,991

RELAY

Ira B. Penniman, Canton, Ohio, assignor to The Weber Dental Manufacturing Co., Canton, Ohio, a corporation of Ohio Application January 20, 1947, Serial No. 723,121

11 Claims. (Cl. 200—87)

This invention relates to relays, especially to two position relays that are irregularly energized but that are adapted to move only once from one position to their other position on such energization.

Industry has many requirements for controls and regulators and one control that has many uses is that required to select one of two operations that are to be alternately performed. Such operations are of the type relating to the present invention and they may be irregularly performed and, while other controls may be used, relays form one of the most practical and rugged means for effecting the desired control.

Heretofore, various types of relays have been provided to control repetitive operations such as starting and stopping motors, reversing the rotation of motors, accepting or rejecting tested articles, etc. As far as I am aware, all of such relays have required two control buttons or points, which make such relays undesirable for many operations.

The use of a single control for performing alternate functions sets up the problem that each actuation of the control must produce a different result and such control must be positive in its action.

The general object of the present invention is to avoid and overcome the foregoing and other problems and disadvantages of control relays and to provide a relay that is characterized by its positive control of alternate functions by a single actuation member.

Another object of the invention is to provide a two position relay that is restricted in its movement on each actuation thereof and is retained in a given position until thte next energization (actuation) thereof.

Another object of the invention is to provide a compact, sturdy relay which is of novel construction.

A further object of the invention is to provide an irregularly energized relay that is adapted to have two armatures associated therewith, with one of such armatures aiding in the control of the position of the other armature.

Another object of the invention is to provide an auxiliary armature which controls the energization circuit of the main armature.

The foregoing and other objects and advantages of the invention, which will be made apparent as the specification proceeds, are achieved by the provision of a pair of opposed electromagnet coils which are connected to a controllable energization circuit, an armature pivotally positioned between the coils for movement therebetween, a resilient contact arm carried by the armature, a pair of contact points positioned in association with the contact arm with one point being adjacent each coil, and being connected in and to control the energization circuit of the other of the coils, an auxiliary armature associated with the coils, and means connecting the auxiliary armature of the resilient contact arm to prevent its movement when the relay is energized and the armature is moved from one extremity of its movement to its other extremity.

Reference now is made to the accompanying drawings, wherein:

Fig. 5 is a section taken on line 5—5 of Fig. 3 with the auxiliary armature in place.

Fig. 6 is a right side elevation of the relay; and

Fig. 7 is a diagrammatic wiring diagram of the relay.

Figure 1:
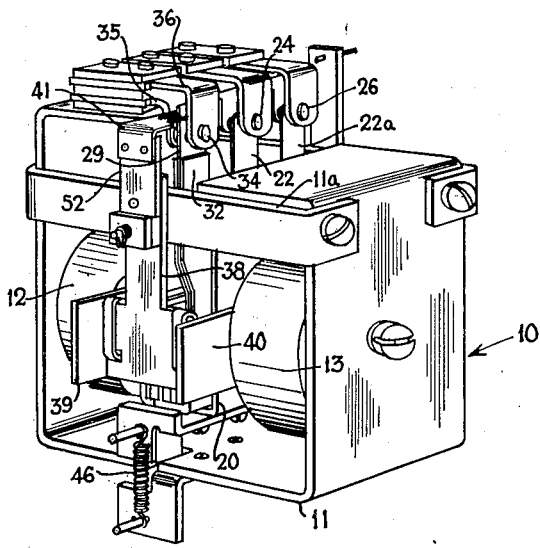
Fig. 1 is a perspective view of a relay embodying the principles of my invention.

With reference to the details of the device shown in the drawings, a relay generally indicated by the numeral 10 is provided which has a substantially U-shaped frame 11 that carries, in any suitable manner, a pair of opposed electromagnet coils 12 and 13. The coils 12 and 13 have leads 14 and 15, and 16 and 17, respectively (Fig. 7), connected to them for energizing the coils, as hereinafter explained. The coils 12 and 13 have pole plates or cores 18 and 19 that concentrate the action of the coils.

Then to perform the circuit changing function of the relay 10, a U-shaped armature 20 is pivotally mounted on a vertically extending fulcrum 21 intermediate the coils 12 and 13 so that the armature 20 can be drawn over against the poles of either of the coils as that coil is energized. The armature carries any number, in this instance two, contact arms 22 and 22a that extend upwardly therefrom and that are designed to contact and form electrical circuits through contacts 23 and 24 and 25 and 26, respectively. These contacts 23, 24, 25 and 26 are connected to a circuit (not shown) to be controlled by the relay 10. Leads 27 and 28 connect to the base portions of the contact arms 22 and 22a with such leads, of course, being connected in the circuit being controlled.

Figure 3:
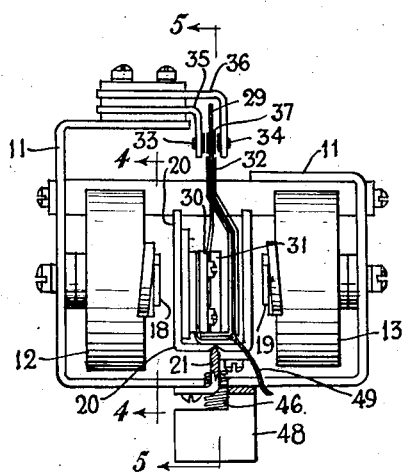
Fig. 3 is a left side elevation of the relay of Fig. 1 with the auxiliary armature removed.

The energization of the coils 12 and 13 is controlled by a resilient contact arm 29 that also is carried by the armature 20 adjacent the other contact arms 22 and 22a. The arm 29 is mounted on a block 30 (Fig. 3), that is carried by but insulated from the armature 20, by screws 31. A suitable insulating material 32 covers the arm 29. Contacts 33 and 34 are secured to arms 35 and 36 that in turn are carried by the upper portion of the frame 11 and provided with any conventional terminal means for connection to an energization circuit. Contacts 33 and 34 are adapted to engage with a contact 37 secured to the arm 29 with the specific contact 33 or 34 being engaged with the contact 37 being determined by the position of the arm 29. Fig. 7 shows that the contact 33 connects to lead 17 which connects to electromagnet coil 13 while contact 34 connects to lead 15 of coil 12. Or, the right hand contact 34 connects to the left hand coil and vice versa, and the arm 29 will in its right extremity of movement connect the left coil in an energization circuit. Of course, the arm 29 will extend in an inclined direction to the right when the armature 20 is against the right hand coil 13.

To control the position of the resilient contact arm 29 when the relay is energized and as a special feature of the invention an auxiliary armature 38 is pivotally mounted on a strap 11a secured to the upper part of the frame 11. This armature 38 is mounted on the side of the relay 10 out of the confines of the armature 20 and it has extension plates or poles 39 and 40 provided for it. These extension plates 39 and 40 are suitably secured to the cores 18 and 19 of the electromagnet coils 12 and 13 and are, of course, energized when such associated coils are energized with the auxiliary armature being drawn against one or the other plate as such plate is energized.

The auxiliary armature 38 has a bifurcated bracket member 41 secured to its upper end and such bracket 41 engages with the upper end of the resilient contact arm 29 so as to control its action when the auxiliary armature is held against movement, as hereinafter explained.

Another feature of the invention resides in the provision of means for holding the armature 20 in a given position after the relay 10 is no longer energized. To this end, means such as a toggle member 42 is pivotally secured to a strap 43 on the frame 11 and it is pivotally connected to a toggle link 44, which is secured to the armature 20 by a pin 45. The link 44 extends transversely of the armature 20 across the bottom thereof as well as vertically of it on its rear portion and moves with the armature. Coil springs 46 connect between a member 48 secured to and extending downwardly of the frame 11 and the link 44 on each side of the relay to aid in retaining the armature 20 in a given position while a spring strip 47 also extends between the upper end of the toggle member 42 and the lower part of the frame, as shown in Fig. 6, which shows the armature 20 in its neutral position, to aid in locking the armature in position.

To operate the relay 10, leads 49 and 50 connect the base end of the resilient contact arm 29, and the junction of the leads 14 and 16, respectively, to a power source, normally 110 volts A. C. As the relay is to be energized at intermittent periods and usually only briefly and to secure alternate actions, I show a conventional make and break switch 51 in the lead 49 for controlling the energization of the relay 10.

To summarize and clarify the relay's operation, it now will be set forth for an operational cycle. Assume the main armature to be in its extreme position towards the right (Fig. 1) wherein it is against the core 19 of the coil 13 and it is retained in such position by the springs 46 and 47. The relay is not energized at this time and the resilient contact arm 29 then is also positioned at its extreme right hand position against contact 34, which in turn connects to the electromagnet coil 12 on the left of the relay. Now, when switch 51 is closed, it energizes coil 12 and the main armature 20 pivots or is pulled over against the core 18. This action of the armature 20 normally would pull the arm 29 over against contact 33 to energize the coil 13 and pull the armature 20 back to its original position whereupon the cycle would continue until the switch 51 was opened. Such "pumping" action of the relay is prevented by the auxiliary armature 38, which due to its construction and arrangement will be against the plate 39 when the armature 20 is against the core 19 in its unenergized starting position.

Hence the initial surge of energy through the relay 10 (coil 12) will hold the auxiliary armature 38 in its original position and the bracket 41 will, in turn, prevent the resilient contact arm from following the main armature as it is drawn over to its position adjacent the coil 12. When the switch 51 is opened, the restraining force of the auxiliary armature will be removed and then the resilient contact arm 29 will be permitted to snap over to its normal position with relation to the armature 20 so that it will separate from contact 34 and bear on contact 33 on the left side of the relay to set up the relay for its next (and alternate) function.

Thus it is seen that the relay 10 will move once, and only once, on each energization and that it can be used to control any alternate function, such as starting or stopping a motor, opening or closing a gate, accepting or rejecting an article, etc. The positive action of the relay by its one control member (switch 51) makes it an effective desirable control device and the objects of the invention are achieved by provision of the relay 10.

Figure 4:
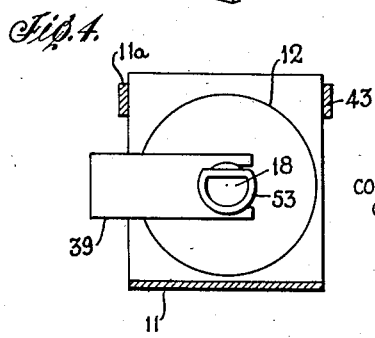
Fig. 4 is a vertical section on line 4—4 of Fig. 3.
Figure 2:
Fig. 2 is a plan of the relay of Fig. 1.
Figure 2:
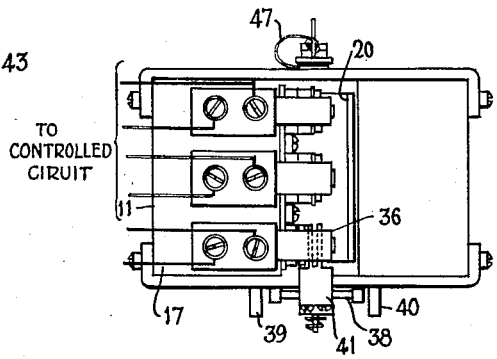

In the embodiment of the invention illustrated, a suitable insulating block 52 is positioned between the auxiliary, armature 38 and the bifurcated bracket 41 and the auxiliary armature usually should be insulated from the frame 11 in any conventional manner. A conventional conductive ring 53 may be associated with each of the cores 18 and 19, as best shown in Fig. 4.

While the auxiliary armature, as shown, contacts the plates 39 and 40 in some instances it may be preferable to have the auxiliary armature positioned between other magnetic holding means with which the armature would not actually contact on its movement therebetween. Likewise, the contact arm 29 might be replaced by a stiff arm that is hinged to the armature 20 and connected to the armature by a light spring or springs adjacent the free end of the arm. Thus the armature could move and store energy in the springs for later movement of the stiff arm upon its release on deenergization of the relay. Or, the contact 37 could even be mounted on the auxiliary armature 38 with the upper end of such armature being connected to the adjacent part of the armature 20 by springs so that the auxiliary armature could be held stationary as the armature 20 moves and be moved thereafter by the springs that connect it to the armature 20.

While one complete embodiment of the invention has been described herein, it will be understood that the invention is not limited to the illustration described herein but that it may be modified within the scope of the appended claims.

What is claimed is:

1. A relay comprising a pair of opposed electromagnet coils, means for alternately energizing one of said coils at a time, an armature, means pivotally positioning said armature between said coils for movement between said coils, a resilient contact arm carried by said armature, conductor means connected to said contact arm, a pair of contact points positioned in association with said resilient contact arm and with one point being associated with each of said coils, each of said contact points being connected to said energization means with the point adjacent each one of said coils being connected so as to connect the other of said coils to said energization means when said resilient contact arm is engaged therewith, an auxiliary armature, contact means for said auxiliary armature associated with said coils, means pivotally positioning said auxiliary armature between said contact means for pivotal movement therebetween, and means carried by said auxiliary armature and engaged with said resilient contact arm, said auxiliary armature being adapted to be retained against the next of said coils to be energized upon the energization thereof and to prevent movement of said resilient contact arm as long as the same one of said coils is energized.

2. A relay comprising a frame, a pair of opposed electromagnet coils secured to said frame, means for alternately energizing one of said coils at a time, a substantially U-shaped armature, means pivotally positioning said armature between said coils for movement therebetween, at least one contact arm carried by said armature, opposed contacts for said contact arm to connect same to a circuit to be controlled by the relay, a resilient contact arm carried by said armature, conductor means connected to said contact arms, contact points carried by said frame for said resilient contact arm, one of said contact points being positioned adjacent each of said coils to connect the other of said coils to said energization means when said resilient contact arm is positioned normally adjacent one of said coils by said armature prior to energization of the relay, toggle means for retaining said armature in a given position against one of said coils, an auxiliary armature, magnetic holding plates for said auxiliary armature secured to said coils and extending laterally therefrom, means pivotally positioning said auxiliary armature adjacent to said coils and between said plates for pivotal movement therebetween, and means carried by said auxiliary armature and engaged with said resilient contact arm to prevent its movement when said armature is drawn over against the opposite coil on energization of the relay.

3. A relay comprising a frame, a pair of opposed electromagnet coils secured to said frame, means for alternately energizing one of said coils at a time, a substantially U-shaped armature, means pivotally positioning said armature between said coils for movement between said coils, at least one contact arm carried by said armature, opposed contacts for said contact arm, a resilient contact arm carried by said armature, conductor means connected to said contact arms, opposed contact points carried by said frame for said resilient contact arm and adapted to be individually contacted thereby, each of said contact points being connected to said energization means so as to connect one of said coils for energization when said resilient contact arm is engaged therewith, means for retaining said armature in a given position against one of said coils, an auxiliary armature, magnetic holding plates for said auxiliary armature secured to said coils and extending therefrom, means pivotally positioning said auxiliary armature on said frame and between said plates for pivotal movement therebetween, the construction and arrangement of said energization means, said armature, and said resilient contact arm being such as to move such arm upon energization of one of said coils so as to break the energization of the one of said coils then energized and to connect the other of said coils for energization, and means carried by said auxiliary armature and engaged with said resilient contact arm to move said auxiliary armature and such means over against the next of said coils to be energized upon breaking the energization of one of said coils and to prevent such movement as long as the same one of said coils is energized.

4. A relay comprising a pair of opposed electromagnet coils, means for alternately energizing one of said coils at a time, a substantially U-shaped armature, means pivotally positioning said armature between said coils for movement therebetween, a resilient contact arm carried by said armature, conductor means connected to said contact arm, contact points for said contact arm, each of said contact points being connected to said energization means to connect one of said coils for energization when said resilient contact arm is engaged therewith, an auxiliary armature, magnetic holding means for said auxiliary armature associated with said coils and extending therefrom, means positioning said auxiliary armature adjacent to said coils and between said magnetic holding means for movement therebetween, and means carried by said auxiliary armature and engaged with said contact arm to prevent its movement as long as the same one of said coils is energized, said contact arm being adapted to move said auxiliary armature so that one portion thereof is adjacent the next of said coils to be energized upon breaking the energization of one of said coils.

5. In a relay, a pair of opposed electromagnet coils, an armature pivotally mounted to oscillate between said coils, an auxiliary armature pivotally associated with said coils and adapted to move therebetween, means for alternately energizing one or the other of said coils, contact means carried by said armature to connect to said energization means to determine which of said coils is to be energized, and means carried by said auxiliary armature and engaged with said contact means to aid in moving one portion of said auxiliary armature to a position adjacent the next of said coils to be energized upon the breaking the energization of one of said coils and to prevent such movement as long as the same one of said coils is energized.

6. A combination as in claim 5 wherein said contact means are retained in one position by said means on said auxiliary armature on each energization of the relay.

7. In a relay, a pair of opposed electromagnet coils, an armature pivotally mounted to oscillate between said coils, an auxiliary armature associated with said coils and pivotally positioned intermediate both its extremities and the extremities of said armature, means for alternately energizing one and then the other of said coils, means carried by said armature to connect to said energization means to determine which of said coils is to be energized, and means carried by said auxiliary armature and engaged with said last-named means to prevent its movement as long as the same one of said coils is energized.

8. In a relay, a pair of opposed electromagnet coils, an armature pivotally mounted to oscillate between said coils, an auxiliary armature associated with said coils for pivotal movement therebetween, energization means for said coils, a pair of contact means for connecting one or the other of said coils to said energization means, means carried by said armature to connect to one of said contact means to determine which of said coils is to be energized, said last-named means being movable with relation to said armature and being adapted to store energy on relative movement therebetween, and means carried by said auxiliary armature and engaged with said last-named means to prevent movement thereof as long as the same one of said coils is energized.

9. In a relay, a pair of opposed electromagnet coils, an armature positioned for movement between said coils, resilient contact means associated with said armature for connecting one of said coils in an energization circuit, one of said pair of contact means being positioned adjacent each of said coils and being adapted to connect the opposite of said coils in an energization circuit, and means for preventing movement of said resilient contact means with said armature when the relay is energized and said armature is moved to a position against one of said coils.

10. A combination as in claim 7 wherein a pair of spaced energization means are provided, one end of said auxiliary armature is adapted to be moved between said electromagnet coils and its other end to be moved from a point adjacent one of said energization means to a point adjacent the other of said energization means, said last-named means on said armature being adapted to snap said auxiliary armature from its one extreme position to its other when the energization of one of said coils is broken.

11. In a relay, a pair of opposed electromagnet coils, an armature pivotally mounted to oscillate between said coils, an auxiliary armature associated with said coils and pivotally positioned intermediate both its extremities and the extremities of said armature, means for alternately energizing one and then the other of said coils, means associated with said auxiliary armature for connecting to said energization means to determine which of said coils is to be energized, said auxiliary armature being movable with relation to said armature, and means for storing energy upon relative movement of said armature and said auxiliary armature whereby said auxiliary armature can be retained in a position on energization of the relay and movement of said armature and be moved thereafter on deenergization of the relay.

IRA B. PENNIMAN.